United States Patent [19]
Goldsmith et al.

[11] Patent Number: 5,428,449
[45] Date of Patent: Jun. 27, 1995

[54] CROSS-SECTIONAL AREA MEASURING MACHINE

[75] Inventors: Morty Goldsmith, Montreal; Michel Hone, St-Placide, both of Canada

[73] Assignee: Ivaco Rolling Mills Limited Partnership, L'Orignal, Canada

[21] Appl. No.: 79,241

[22] Filed: Jun. 17, 1993

[51] Int. Cl.⁶ .................. G01N 21/86; G01B 11/08
[52] U.S. Cl. .................. 356/385; 356/386; 356/387; 250/560
[58] Field of Search .............. 356/376, 380, 384, 385, 356/386, 387, 426; 250/560

[56] References Cited

U.S. PATENT DOCUMENTS

| | | | |
|---|---|---|---|
| 3,709,610 | 1/1973 | Kruegle | 356/384 |
| 3,851,180 | 11/1974 | Kato et al. | 250/560 |
| 4,634,273 | 1/1987 | Farleman et al. | 356/387 |
| 4,785,193 | 11/1988 | Dassler et al. | 250/560 |
| 4,894,551 | 1/1990 | Kishimoto et al. | 250/560 |
| 4,972,090 | 11/1990 | Eaton | 250/560 |
| 5,004,930 | 4/1991 | Gremaud et al. | 356/387 |
| 5,311,291 | 5/1994 | Cholet | 356/387 |

FOREIGN PATENT DOCUMENTS

| | | | |
|---|---|---|---|
| 55-37918 | 3/1980 | Japan | 356/387 |
| 61-161405 | 7/1986 | Japan | 356/384 |
| 1-148903 | 6/1989 | Japan | 356/385 |
| 3-25346 | 2/1991 | Japan | 356/387 |

*Primary Examiner*—William Mintel
*Assistant Examiner*—Minhloan Tran
*Attorney, Agent, or Firm*—Chilton, Alix & Van Kirk

[57] ABSTRACT

The machine determines the cross sectional shape and area of an elongated wire or cable-like product by rotating the product about its longitudinal axis. A laser beam is directed at the longitudinal axis for transmitting a laser beam at the peripheral surface of the product at a plurality of predetermined angular increments during rotation of the product, e.g., 5000 times per revolution. The laser beam impinges on the plurality of points on the peripheral surface and is reflected from the peripheral surface to a laser receiver which is connected to a processor. The processor calculates the distance of the laser to the peripheral surface at each of the plurality of points whereby the magnitude of a radius of the product is obtained at each of the points.

11 Claims, 3 Drawing Sheets

CROSS-SECTIONAL AREA MEASURING MACHINE

BACKGROUND OF INVENTION

1. Field of the Invention

The invention relates to an apparatus for determining the cross sectional shape and area of an elongated wire or cable-like product. The invention also relates to a method for determining the cross sectional shape and area of the elongated wire or cable-like product using the inventive apparatus.

2. Description of Prior Art

Continuous, in-line rolling of steel wire rod, or other wire or cable-like products, in a high speed mill is a process which is controlled by maintaining strict control of the cross sectional area of the product at various points in the process. Because of speed, access and environmental limitations, a continuous measurement of the cross sectional area is not feasible. Accordingly, the process is controlled statistically by taking samples of the product in process in a controlled fashion. The cross sectional area of the samples are measured and statistical methods are used to determine process corrections.

Samples taken for this purpose are approximately 30 cm long and typically have an irregular cross sectional shape. Proper process control demands frequent sampling with quick return of cross sectional area data.

Because of the irregular shape, accurate cross sectional area measurement is complicated. Existing methods require the sample to be cooled, cut to an accurate length with clean faces using a cold saw, and weighed on an accurate balance scale. Using the known density of steel and known length, cross section is calculated and plotted for statistical purposes. The process is tedious and prone to inaccuracy.

Other approaches of the prior art are illustrated in U.S. Pat. Nos. 3,851,180, Kato et al, Nov. 26, 1974 and 3,709,610, Kruegle, Jan. 9, 1973.

The '180 patent uses a laser arrangement to measure the diameter of the fine wire by counting the spacing between bright spots of a Fraunhofer diffraction image formed by irradiating the fine wire with parallel laser light beams.

The '610 patent uses the same approach and measures the spacing between light and dark portions of the diffraction pattern.

Although the diameter of the fine wire is determined using the patented apparatus, unless we assume a circular shape, neither the shape nor the cross sectional area is determined using these approaches.

SUMMARY OF INVENTION

It is therefore an object of the invention to provide an apparatus which can measure both the cross sectional shape and area of an elongated wire or cable-like product.

It is also an object of the invention to provide a method for performing the measuring using the inventive apparatus.

It is also an object of the invention to provide an apparatus and method which provides the measurements in a short time, typically, within 15 seconds.

It is a further object of the invention to provide an apparatus which is computer controlled, the computer automatically interpreting the statistical significance of the results.

In accordance with a particular embodiment of the invention there is provided an apparatus for determining the cross sectional shape and area of an elongated wire or cable-like product, comprising:

means for rotating said product about the longitudinal axis thereof;

laser means including a laser beam source directed at said longitudinal axis for transmitting the laser beam of said laser beam source at the peripheral surface of said wire or cable-like product for at least a complete rotation of said product;

whereby, said laser beam impinges on a plurality of points on said peripheral surface at a like plurality of predetermined angular increments, each point corresponding with a respective angular increment, said laser beam being reflected by said peripheral surface at each of said points;

said laser means further including receiver means for receiving said laser beam reflected from said peripheral surface at each of said plurality of points; and processor means, connected to said laser means, for calculating the distance from said laser means to said peripheral surface at each of said plurality of points;

whereby, the magnitude of a radius of said product is obtained at each of said points.

From a different aspect and in accordance with a particular embodiment of the invention there is provided a method for determining the cross sectional shape and area of an elongated wire or cable-like product, comprising:

rotating said product about its longitudinal axis;

directing a laser beam source of a laser means at said longitudinal axis for transmitting the laser beam of said laser beam source at the peripheral surface of said wire or cable-like product for at least a complete rotation of said product;

whereby, said laser beam impinges on a plurality of points on said peripheral surface at a like plurality of predetermined angular increments, each point corresponding with a respective angular increment, said laser beam being reflected by said peripheral surface at each of said points;

receiving, in a receiver means of said laser means, each said laser beam reflected from said peripheral surface at each of said plurality of points; and calculating the distance from said laser means to said peripheral surface at each of said plurality of points using a processor means;

whereby, the magnitude of a radius of said product is obtained at each of said points.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
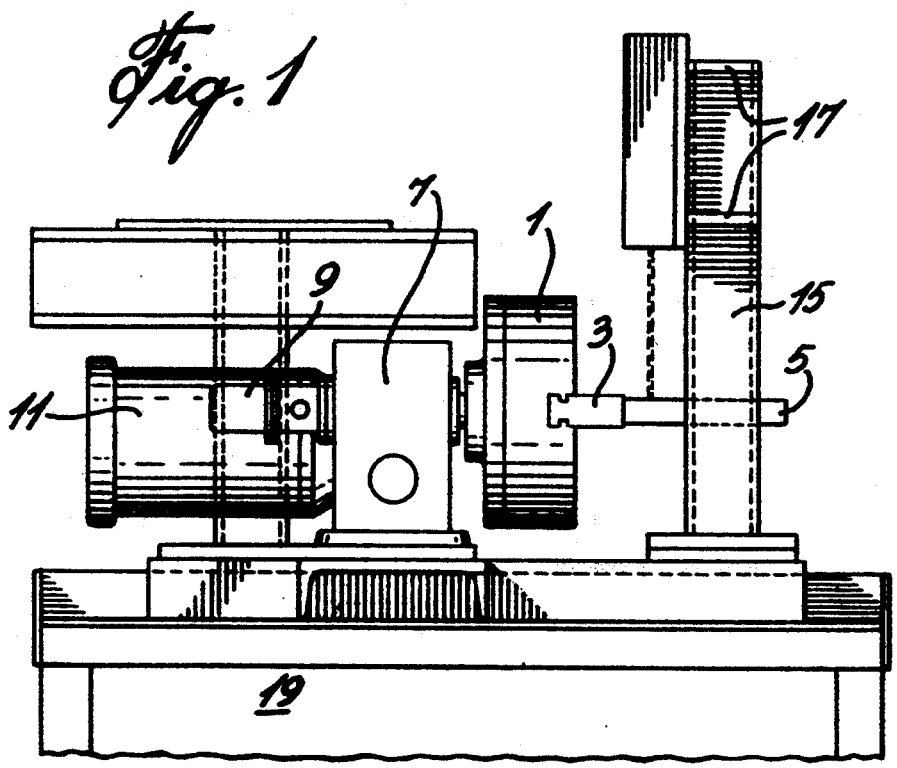
FIG. 1 is a side view of the inventive apparatus.
Figure 2:
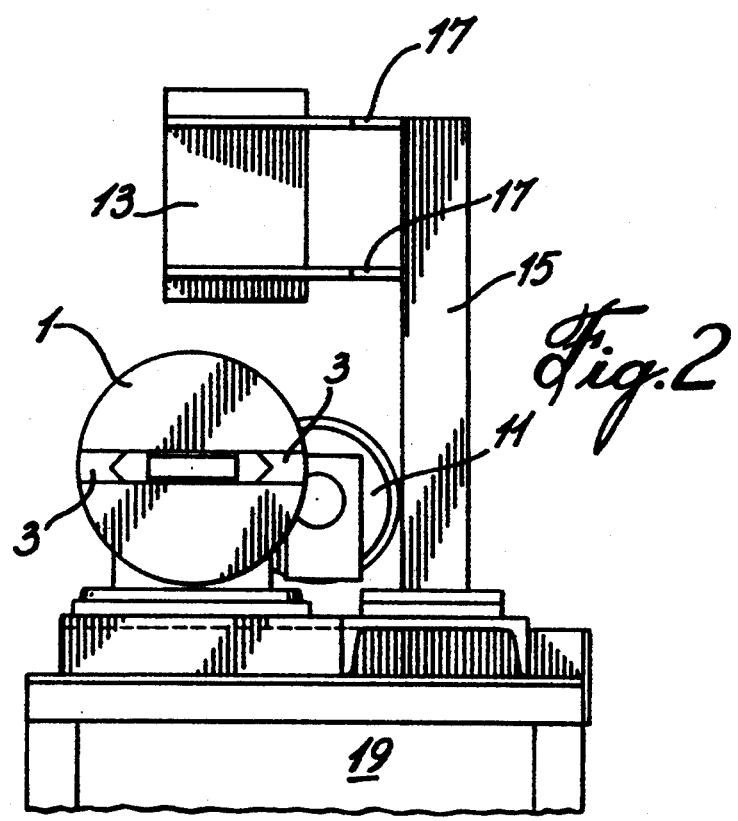
FIG. 2 is a front view of the apparatus in FIG. 1.
Figure 3:
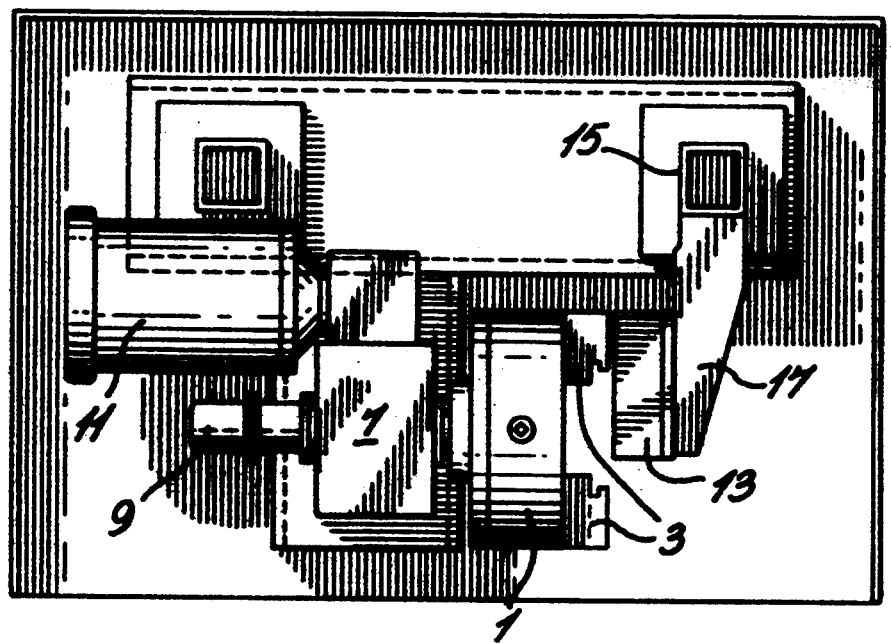
FIG. 3 is a simplified diagram showing the electrical connection between the laser arrangement and the CPU.

Referring to FIGS. 1 to 3, it will be seen that the apparatus includes a universal two jaw chuck 1 mounting two moveable jaws 3. The jaws 3 are mounted so as to be able to slide towards or away from each other in the chuck. As seen in FIG. 1, a sample 5 is mounted in the jaws 3 and carried by the jaws 3 for rotation about the axis of the sample 5 with the chuck 1.

The chuck is mounted on a speed reducer 7 which includes horizontal double extending output shafts. One of the shafts is connected to the chuck to rotate the chuck. An opposite shaft is connected to rotary encoder 9 which provides a predetermined number of pulses per revolution. The rotary encoder 9 is preferably an optical rotary encoder which provides 5000 pulses per revolution.

Speed reducer 7 is driven by motor 11. In a preferred embodiment, the ratio as between the motor and the speed reducer is such as to produce an output speed of one revolution in 10 seconds so that the chuck 1 will be driven through a single revolution in 10 seconds.

A laser arrangement 13 is mounted over the sample as best seen in FIG. 1. The laser arrangement 13 is mounted on a stand 15.which supports horizontally extending arms 17. The arms 17, as best seen in FIG. 2, carry the laser arrangement 13. The laser is mounted so that, a beam emitted by the laser, is directed at the longitudinal axis of the samples 5 and reflected by the peripheral surface of the sample 5. As shown in FIGS. 1 and 2, the beam is directed substantially at right angles to the longitudinal axis of sample 5.

The entire apparatus is mounted on a cabinet 19 which houses a microprocessor.

Figure 4:
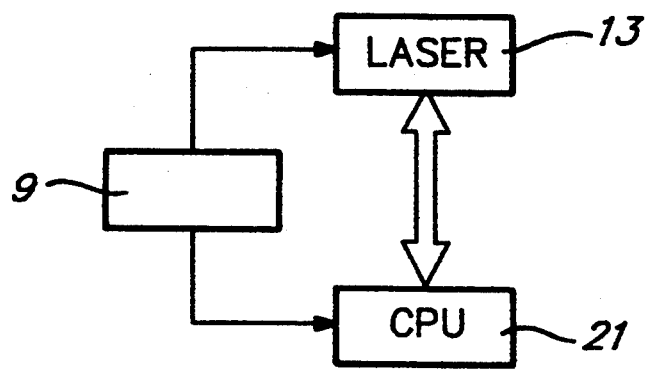

The relationship between the microprocessor, shown at 21 in FIG. 4, the laser arrangement 13 and the rotary encoder 9 is illustrated in FIG. 4. The laser, with the beam directed at the longitudinal axis of the sample 5, is turned on for at least one complete rotation of the sample 5. As can be seen, the rotary encoder provides an initiating pulse to the laser arrangement so that the receiver of the laser arrangement takes a reading each time a pulse is transmitted from the rotary encoder. In the preferred embodiment, 5000 pulses will be presented from the rotary encoder to the laser arrangement during a single revolution of the chuck. Accordingly, the laser receiver will take 5000 readings during a single revolution.

It will also be apparent that the laser transmitter could be interrupted 5000 times during a revolution to provide 5000 beams, each of which would be read by the receiver to once again obtain 5000 readings.

As the pulses of the rotary encoder are equally angularly spaced, the angular increments between any two adjacent readings will be equal. Accordingly, 5000 equal angular increment readings will be taken as sample 5 rotates through a single revolution.

Obviously, more or less readings could be taken. In one embodiment, the laser arrangement, including both the transmitter and receiver, comprises a Chesapeake laser LTG-2100. 5000 distance readings can be taken during a single revolution of a chuck.

After the 5000 readings have been taken, and in accordance with a particular embodiment, rotation of the chuck continues until the computer receives an index pulse from the rotary encoder 9. The computer will then provide a signal to stop the chuck in a preprogrammed radial position selected to permit easy access to the chuck key socket and to permit removal of the sample.

In operation, before taking measurements on a production basis, a calibrated standard sample, consisting of a cylindrical plug gauge, is loaded in the chuck and rotated to obtain 5000 distant measurements. The computer is programmed to average these readings and add the radius of the standard to this average. The sum of the average and the radius of the standard is the distance from the laser to the axis of rotation, hereinafter, the calibration distance. This number is stored by the computer to perform area calculations and to present data for displaying of the shape of a sample.

To determine the cross sectional area and to provide data for displaying the shape of a sample, the sample is inserted in the jaws of the chuck and the motor is turned on to rotate the chuck. The rotary encoder provides the initiating signals to the laser and synchronization signals to the microprocessor. In a preferred embodiment, as above described, 5000 such signals are provided during a single revolution of the chuck. Once again, readings will be taken at 5000 equally spaced locations along the periphery of the sample. It is of course possible to use all of these readings to obtain data for calculating cross sectional area as well as data for displaying the shape of the sample. However, in a preferred embodiment, every 10 sequential readings, of 10 sequential positions, are averaged. The average reading is then subtracted from the calibration distance to obtain a radius magnitude and this radius magnitude is used in the 10 sequential positions. 500 such average radii are obtained. The data of the radii can be provided to a display device for displaying the cross sectional shape of the sample.

The laser electronics can determine when readings are not suitable for distance measurement and is programmed to disregard these. The software takes each group of ten readings, discards those determined to be faulty by the laser electronics, and averages the remainder. If there are more than two faulty readings in any group of ten, the display will indicate that the measuring cycle should be repeated. The average of the good readings is used as the value for each of the ten readings for the purpose of displaying cross sectional shape and calculating area.

To calculate the area, a first one of the 5000 average radii is multiplied by its adjacent average radius, and the adjacent average radius is then multiplied by its adjacent average radius. This procedure is continued until each average radius has been multiplied by its adjacent average radius. Thus, R1 is multiplied by R2, R2 is multiplied by R3, R3 is multiplied by R4, etc, up until R5000 is multiplied by R1. The multiplicands above obtained are added together, and this total is multiplied by the sine of the angle between two adjacent radii and divided by 2 to obtain the total area of the sample. Although a small error is introduced due to the cross sectional shape of the part, because a large number of radii are used, the error is not significant.

Figure 5:
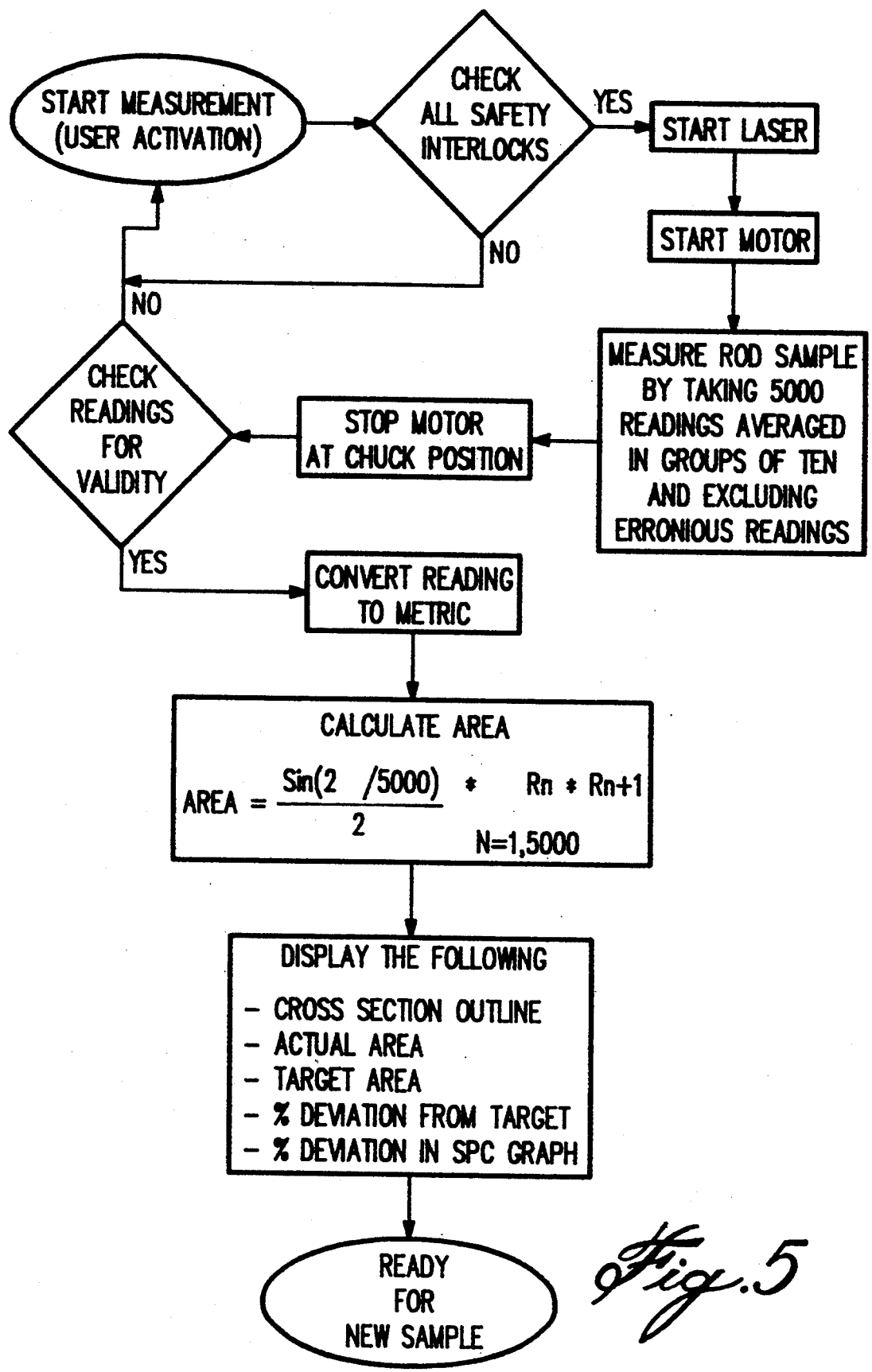
FIG. 5 is a flow chart for a program to drive the processor of the apparatus.

A flow chart for a program for driving the computer for carrying out the above process is shown in FIG. 5 hereof.

The value of each sample can then be displayed along with graphical and numerical percentage deviation from a target value. In addition, the value of each sample can be statistically compared with the values of other samples.

The time required for all calculations is less than 1 second. Cycle time for the machine varies from approximately 11 to 15 seconds depending on where the reading started in relation to the index pulse from the rotary encoder 9.

Although a particular embodiment has been described, this was for the purpose of illustrating, but not limiting, the invention. Various modifications, which will come readily to the mind of one skilled in the art, are within the scope of the invention as defined in the appended claims.

We claim:

1. Apparatus for determining the incremental radius of an elongated product having a longitudinal axis, comprising:
    rotating means for releasably holding said elongated product and for rotating said product about the longitudinal axis thereof;
    measuring means including a collimated light beam source directed at said longitudinal axis for transmitting the collimated light beam of said light source at the peripheral surface at substantially right angles to the longitudinal axis of said elongated product for at least a complete rotation of said product;
    whereby, said collimated light beam impinges on a plurality of points on said peripheral surface at a like plurality of predetermined equal angular increments, each point corresponding with a respective angular increment, said collimated light beam being reflected by said peripheral surface at each of said points;
    said measuring means further including receiver means for receiving said collimated light beam reflected back from said peripheral surface at each of said plurality of points; and
    processor means, connected to said measuring means, for calculating the distance from said light source to said peripheral surface at each of said plurality of points;
    whereby, the magnitude of the radius of said product is obtained at each of said points.

2. Apparatus as defined in claim 1 wherein said means for rotating comprises a chuck, having moveable jaws for grasping said product, driven by a motor.

3. Apparatus as defined in claim 2 wherein said chuck is connected to said motor through a speed reducer.

4. Apparatus as defined in claim 1 and including encoder means to provide initiating signals to said measuring means and synchronizing signals to said processor means.

5. Apparatus as defined in claim 4 wherein said encoder means provides 5000 pulses for every revolution to produce 5000 points of light on the periphery of the elongated product at 5000 incremental angles.

6. An apparatus as defined in claim 1 wherein the shape and cross-sectional area of the elongated product is calculated by a computer means programmed to determine the radius average and to add the radius of calibration to the average, wherein the radius of calibration is the distance from the light source to the longitudinal axis, and then to calculate the area, and to display the shape of the product.

7. A method for determining the cross sectional shape and area of an elongated product, comprising:
    rotating said product about its longitudinal axis;
    directing a collimated light beam at said longitudinal axis for transmitting the light beam of said light source at the longitudinal axis of said product for at least a complete rotation of said product;
    whereby, said light beam impinges on a plurality of points on said peripheral surface at a like plurality of predetermined equal angular increments, each point corresponding with a respective angular increment, said light beam being reflected by said peripheral surface at each of said points;
    receiving, in a receiver means, each said light beam reflected from said peripheral surface at each of said plurality of points;
    calculating the distance from said light source to said peripheral surface at each of said plurality of points using a processor means, whereby, the magnitude of a radius of said product is obtained at each of said points;
    determining from the average radius, the cross-sectional shape and area of the product.

8. A method as defined in claim 7 wherein said product is rotated by a chuck, having moveable jaws for holding said product, which chuck is driven by a motor.

9. A method as defined in claim 7 wherein said light source is activated at each of said predetermined angular increments by encoder means, said encoder means also providing a synchronizing signal for said processor means.

10. A method as defined in claim 9 wherein said encoder means provides 5000 initiating signals per revolution of said chuck.

11. A method as defined in claim 7 wherein the shape and cross-sectional area is calculated by a computer means programmed to determine the radius average and to add the radius of calibration to the average, wherein the radius of calibration is the distance from the light source to the longitudinal axis and then to calculate the area, and to display the shape of the product.

* * * * *